(12) United States Patent
Daub et al.

(10) Patent No.: US 12,140,253 B2
(45) Date of Patent: Nov. 12, 2024

(54) SUPPORT FOR AN ENERGY SUPPLY CHAIN

(71) Applicant: TSUBAKI KABELSCHLEPP GMBH, Wenden-Gerlingen (DE)

(72) Inventors: Mark Daub, Mudersbach (DE); Thomas Wendig, Katzwinkel/Elkhausen (DE)

(73) Assignee: Tsubaki Kabelschlepp GmbH, Wenden-Gerlingen (DE)

( * ) Notice: Subject to any disclaimer, the term of this patent is extended or adjusted under 35 U.S.C. 154(b) by 0 days.

(21) Appl. No.: 18/013,794

(22) PCT Filed: Jun. 29, 2021

(86) PCT No.: PCT/EP2021/067775
§ 371 (c)(1),
(2) Date: Dec. 29, 2022

(87) PCT Pub. No.: WO2022/008291
PCT Pub. Date: Jan. 13, 2022

(65) Prior Publication Data
US 2023/0287996 A1 Sep. 14, 2023

(30) Foreign Application Priority Data
Jul. 8, 2020 (DE) .................... 20 2020 103 942.3

(51) Int. Cl.
*F16L 3/18* (2006.01)
*F16B 7/22* (2006.01)

(52) U.S. Cl.
CPC . *F16L 3/18* (2013.01); *F16B 7/22* (2013.01)

(58) Field of Classification Search
CPC ....... F16L 3/18; F16L 3/16; F16L 3/00; F16B 7/22; F16B 7/00; F16B 7/16; F16B 7/10
USPC .... 174/68.3, 72 A, 48, 68.1, 69, 70 C, 99 E, 174/100, 101
See application file for complete search history.

(56) References Cited

U.S. PATENT DOCUMENTS

| | | | | |
|---|---|---|---|---|
| 6,118,075 A | * | 9/2000 | Baker | H04Q 1/06 52/712 |
| 6,603,073 B2 | * | 8/2003 | Ferris | H02G 3/0608 174/72 A |
| 10,693,285 B2 | * | 6/2020 | Jaeker | H02G 3/0608 |
| 11,217,973 B2 | * | 1/2022 | Jaeker | F16G 13/16 |
| 2003/0047343 A1 | * | 3/2003 | Ferris | H02G 3/0608 174/68.3 |
| 2017/0222412 A1 | * | 8/2017 | Jaeker | H02G 3/0608 |

FOREIGN PATENT DOCUMENTS

WO 20160015942 A1 2/2016

* cited by examiner

*Primary Examiner* — Nkeisha Smith
(74) *Attorney, Agent, or Firm* — BainwoodHuang

(57) ABSTRACT

A support (1) is for an energy supply chain (2). The support (1) is divided in a longitudinal direction (L) into a plurality of sections (5), wherein the sections (5) each have at least one tooth (6) at their ends, and wherein in each case two adjacent section (5) are interlocked with one another via the teeth (6).

12 Claims, 4 Drawing Sheets

SUPPORT FOR AN ENERGY SUPPLY CHAIN

Figure 1:
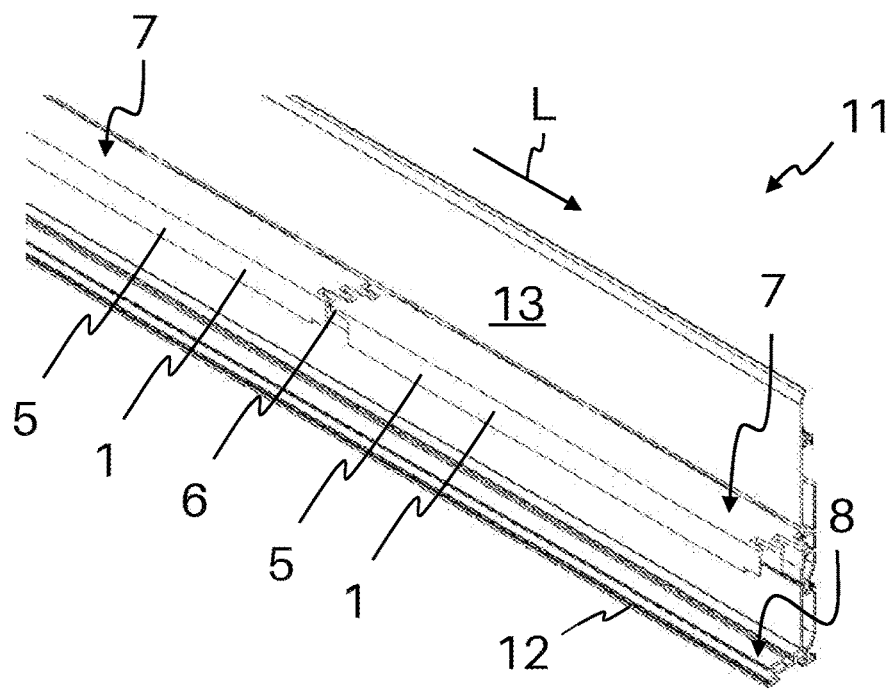

The invention relates to a support for a cable carrier and to a device and an arrangement for such a support.

Cable carriers are used to protect and guide lines such as cables or hoses. Cable carriers can also be referred to as line-guiding devices. A cable carrier can be composed of links or be designed as a single piece. It is known to support cable carriers partially with a support. Such a support can, for example, be arranged such that the upper run of the cable carrier can be laid on the support. If the cable carrier is moved, the upper run moves along the support. The friction which thus occurs can be reduced by rollers. In the case of known supports, stresses which can damage the supports or their brackets, are regularly caused by changes in temperature.

The object of the present invention is, starting from the prior art, to provide a support which can withstand changes in temperature particularly well. In addition, a corresponding device and arrangement are to be proposed.

These objects are achieved by a support, a device, and an arrangement as disclosed herein. Further advantageous embodiments are described herein. The features in the description can be combined in any technologically expedient fashion.

According to the invention, a support for a cable carrier is proposed. The support is divided in the longitudinal direction into a plurality of sections. The sections each have at least one tooth at their ends. In each case, two adjacent sections are interlocked with each other via the teeth.

The support is preferably used together with a cable carrier. The configuration of the cable carrier is not relevant. In particular, the cable carrier can be composed of links or be designed as a single piece. The cable carrier can also be referred to as a line-guiding device.

A part of a cable carrier can be laid on the support. The support is preferably designed as a roller support. In this case, the support is specified such that rollers of the cable carrier roll on the roller support. As a result, the part of the cable carrier, in particular an upper run of the cable carrier, can be moved along the support. Alternatively, it is preferred that the support is designed as a gliding support. In this case, the support is specified such that a part of the cable carrier glides on the support, in particular via glide blocks. The cable carrier can also glide on the support without glide blocks. The support can also be a roller or gliding support. In this case, the support is specified such that rollers of the cable carrier roll on the roller support or that a part of the cable carrier glides on the support, in particular via glide blocks.

The support is divided into a plurality of sections in the longitudinal direction. The longitudinal direction is the direction in which the cable carrier can be moved over the support. If the cable carrier has rollers, the longitudinal direction is parallel to a running direction of the rollers. The cable carrier is preferably divided into 5 to 10 sections. The sections are preferably designed so that they are identical to one another. The individual sections are preferably each designed as a single piece.

The thermal expansion in the event of changes in temperature can be compensated by the division of the support into sections. This applies in particular when the support is held on a bracket which is formed from a different material than the support. The embodiment described is particularly well suited for this case such that it is preferred that the support is used with a bracket which is formed from a different material than the support. Thus, the support can be formed, for example, from plastic and be held on an aluminum bracket. The bracket can be designed in particular as a profile, in particular as an aluminum profile. The cross-section of the bracket is preferably constant over the longitudinal direction. Multiple sections of the support can be held on the same bracket. Because plastic and aluminum have different coefficients of expansion, the sections can be displaced relative to each other by thermal expansion of the bracket. Such a displacement is possible because the support is divided into sections. As a result, stresses in the support which could damage the support and/or the bracket are prevented.

There is no need for the support to be held on the bracket so that it can move in the longitudinal direction. There is also no need for the spacing between adjacent sections to actually change during operation. The division of the support into the sections simply makes it possible to compensate movement of adjacent sections relative to each other. This movement can also occur, because of thermal expansion, when the sections are each held securely on the bracket. In particular when the support is used at a constant temperature, the positions of the sections relative to one another can remain unchanged. Nonetheless, it is preferred that the sections are held on the bracket so that they can move in the longitudinal direction. As a result, changes in temperature can be compensated particularly well.

The sections are preferably dimensioned and held on the bracket such that the sections are arranged at a mean temperature with a mean spacing between one another. The mean temperature lies in the middle between the maximum and minimum temperature for which the support is specified and configured. The mean spacing lies in the middle between a maximum and a minimum spacing for which the support is specified and configured. Deviations in the temperature above and below the mean temperature can be compensated by this configuration. At the mean temperature, an expansion joint is thus formed between adjacent sections. This can become larger or smaller when the temperature changes.

If the cable carrier moves over expansion joints between two sections, there is a fundamental problem that noise and/or vibrations are caused. For example, if a roller rolls from one section to the next, the roller can dip into the expansion joint. This can generate the noise and/or cause the vibrations. As a result, the cable carrier, the support, and its brackets can become more worn or even be damaged. Also, in the case of a cable carrier which glides over the support, expansion joints can cause noise to be generated or the cable carrier to run in a jerky fashion.

In the case of the device described, the generation of noise and/or vibrations can be prevented or at least reduced. To do this, the sections have at their ends in each case at least one tooth, wherein in each case two adjacent sections are interlocked with each other via the teeth. This refers to the respective two ends of the sections in the longitudinal direction. These are the ends by means of which the adjacent sections adjoin each other and between which—as long as the temperature does not reach a corresponding extreme value—the expansion joint is formed. The fact that the teeth are interlocked with one another means that the teeth of the adjacent sections at least partially overlap one another in the longitudinal direction. The teeth thus engage in one another. This means that the at least one tooth of a first section engages in each case in a gap next to the at least one tooth of a second section. It is preferred that the sections in each case have a plurality of teeth at their ends. In this case, a tooth of the first section can engage in a gap between two adjacent teeth of the second section.

The interlocking of the sections can in particular prevent rollers from dipping into the expansion joint. This is true in any case when a suitable roller is used. A suitable roller has a running surface with an extent transverse to the longitudinal direction which is greater than the largest extent of the expansion joint transverse to the longitudinal direction. The extent of the expansion joint transverse to the longitudinal direction can be a different size at different points in the longitudinal direction. The roller particularly preferably has an extent transverse to the longitudinal direction which is such that the roller can be in contact with one of the sections at every position in the longitudinal direction. The cable carrier is preferably designed such that, during proper use, the roller is in contact with at least one of the sections at every position in the longitudinal direction. Because of the teeth, the roller cannot then dip into the expansion joint. The roller is thus initially in contact with a first section of the support. When the roller reaches the transition to the following section, only that part of the roller which is situated on the teeth of the first section is still in contact with the support. The remainder of the roller crosses the expansion joint and then comes into contact with the following section. Only then does the rest of the roller also cross the expansion joint.

The configuration of the expansion joint with the teeth additionally has the advantage that the sections can be manufactured and fitted with particularly high tolerances. If the expansion joint were to be straight and run transverse to the longitudinal direction, dipping of rollers into the expansion joint could only be reduced by the expansion joint being designed to be as small as possible. The smaller the expansion joint, the more precisely the sections need to be dimensioned and arranged. A small expansion joint also has the disadvantage that only relatively small changes in temperature can be compensated by it. In contrast, with the support described it is sufficient that the adjacent sections are interlocked with one another via the teeth. The size of the expansion joint between the teeth is very much less important than the size of a straight expansion joint running transversely to the longitudinal direction.

At its two ends in the longitudinal direction, the support can have a respective edge section. The latter has, just at one of its ends, at least one tooth, preferably a plurality of teeth. The edge section can engage in the adjacent section via it or them. No teeth are required at the other end of the edge section, which forms the end of the support. It is therefore preferred that the support has a respective edge section in addition to the sections described at their ends. It is, however, alternatively also possible that the edge sections are designed in the same way as the other sections. In this case, all the sections of the support can be understood as the abovedescribed sections. The teeth at the ends of the support can remain unused in this case. The configuration with no special edge sections makes production easier.

In a preferred embodiment, the support forms a rolling or glide surface for the cable carrier. The rolling or glide surface is formed partly by the teeth.

The rolling or glide surface is an upper surface of the sections of the support. The rolling or glide surface is preferably designed to be flat. The rolling or glide surface is preferably designed such that a cable carrier can glide on the rolling or glide surface or can roll on the rolling or glide surface by means of rollers. In this respect, the support can be used for different cable carriers. In addition, the rolling or glide surface is preferably shaped such that a liquid such as rainwater can run off the rolling or glide surface. The rolling or glide surface is interrupted by the expansion joint between adjacent sections. Rollers of the cable carrier can roll on the rolling or glide surface. To do this, running surfaces of the rollers can come into contact with the rolling or glide surface. Alternatively or additionally, a part of the cable carrier can glide, in particular via glide blocks, on the rolling or glide surface. The fact that the rolling or glide surface is formed partly by the teeth means that, when viewing the rolling or glide surface, the teeth are seen to be the latter.

In a further preferred embodiment of the support, at their ends the sections in each case have a plurality of teeth which are arranged offset relative to one another in the longitudinal direction of the support.

The object of this embodiment is the case where there are multiple teeth per end of a section. The teeth are here arranged offset relative to one another in the longitudinal direction at the end of a section. As a result, for example, the dipping of rollers into the expansion joint can be prevented particularly well. The reason for this is that a roller does not cross from one section to the following section over all the teeth at the same time. The same applies correspondingly for a gliding cable carrier. It is sufficient that the adjacent teeth transverse to the longitudinal direction are arranged at different positions in the longitudinal direction. It is thus, for example, conceivable that every second tooth of an end of a section is arranged at the same position in the longitudinal direction. It is, however, preferred that the teeth of an end of a section are arranged along a line which is oblique to the longitudinal direction. This line can run, for example, through each of the tips of the teeth.

In a further preferred embodiment of the support, the sections each have between 1 and 10 teeth at their ends.

It has been proved that particularly quiet running of the cable carrier can be achieved by this configuration. The case in which the sections each have a plurality of teeth at their ends is preferred. It is, however, sufficient that one tooth is provided per end of a section. For example, a single tooth can be provided at the end of a first section and two teeth at the associated end of a second section. The tooth of the first section can in this case engage in the gap between the two teeth of the second section. It is, however, also conceivable that both sections have just a single tooth at their respective end. In this case, the adjacent sections can be interlocked with one another by the teeth of the two sections being arranged next to each other. In this case, the tooth of a first section engages in a recess which is formed next to the tooth of the second section. This recess is bounded on one side only. The ends of the sections can in this case have in particular an L-shape.

In a further preferred embodiment of the support, the sections have at their ends a respective stop element by means of which adjacent sections can be moved apart from each other in the longitudinal direction of the support only to a limited extent.

The sections can be present in two extreme positions: on the one hand, the sections can be directly in contact with one another. The sections cannot be moved any further closer to one another. On the other hand, the sections can be pulled apart from one another to such an extent that the stop elements come into contact with one another. The stop elements prevent the sections being pulled further apart from one another. This is, for example, possible because in each case one tooth per end of a section has a projection as a stop element. The projection can protrude from the tooth in particular transversely to the longitudinal direction. The movement of the sections in the longitudinal direction can thus be limited by interaction with a corresponding projection on a tooth of the adjacent section. Alternatively, it is, for example, possible that a tooth of a first section has a T-shaped design and that two adjacent teeth of a second section each have an L-shaped design and are arranged such that a recess is formed in which the T-shaped tooth can move only to a limited extent.

In a preferred embodiment, the support forms a rolling or glide surface for the cable carrier. The rolling or glide surface is flattened at at least one end of at least one of the sections transversely to the longitudinal direction.

The fact that the rolling or glide surface is flattened transversely to the longitudinal direction means that the rolling or glide surface slopes toward the respective ends when the support is oriented properly. In a section adjoining the respective end, the rolling or glide surface is thus inclined with respect to the longitudinal direction. In a section between the ends, the rolling or glide surface is preferably designed as flat, in particular horizontally when the support is oriented properly. The rolling or glide surface is flattened at at least one pair of adjoining ends of the sections in each case transversely to the longitudinal direction of the support. The rolling or glide surface is preferably flattened at both respective ends of all the sections. This embodiment is particularly suited for the case where a part of a cable carrier glides over the support. The support is preferably suitable for a roller-less cable carrier. Contact between the cable carrier and the expansion joint can be prevented by the flattened ends.

As a further aspect of the invention, a device for holding and guiding a cable carrier is proposed. The device comprises a bracket and a support fastened thereto. The support is divided into a plurality of sections. The sections each have at least one tooth at their ends. In each case two adjacent sections are interlocked with each other via the teeth.

The described advantages and features of the support can be applied and transferred to the device, and vice versa. The support of the device is preferably designed as described. The support is preferably configured for the device.

The device is suited for holding and guiding a cable carrier. For this purpose, the device has the bracket as well as the support. The bracket serves to hold the support. The bracket can furthermore restrict the movement of the guide channel transversely to the longitudinal direction and in this respect guide the guide channel.

There is no need for the device to be able to bear the whole weight of the cable carrier on its own. It is sufficient that the device can contribute to holding and guiding the cable carrier. The cable carrier can be held by the device in particular to such an extent that a part of the cable carrier can be laid on the support. In particular, a side plate of an upper run of the cable carrier can be laid on the support. The cable carrier preferably has two opposite side plates. Each of the side plates is preferably held at least partially by a respective device designed as described. Two devices are preferably used together as an arrangement, the two devices together holding and guiding the cable carrier. The two devices can in particular be designed so that they are identical with each other or are mirror-symmetrical with respect to each other. The two devices are preferably arranged opposite each other. A cable carrier can alternatively also be held and guided by a device with a single bracket and two supports, wherein the two supports are fastened to the one bracket. In this case, it is preferred that the bracket has a U-shaped design. As a result, the two supports can be held opposite each other inside the U-shaped bracket on its side walls.

In a preferred embodiment of the device, the bracket has a guide surface on which the support is held. A rolling or glide surface of the support is oriented perpendicular to the guide surface.

The guide surface serves to restrict the movement of the cable carrier transversely to the longitudinal direction. For this, there is no need that the cable carrier actually comes into contact with the guide surface during operation. It is sufficient that this is an option during proper operation.

As a further aspect of the invention, an arrangement is proposed which comprises a cable carrier and a support. The support is divided into a plurality of sections. The sections each have at least one tooth at their ends. In each case, two adjacent sections are interlocked with each other via the teeth. A part of the cable carrier lies on a rolling or glide surface formed by the support.

The described advantages and features of the support and the device can be applied and transferred to the arrangement, and vice versa. The support of the arrangement is preferably designed as described. The support is preferably configured for the arrangement. The arrangement is preferably formed by the device and the cable carrier. The device is preferably configured for the arrangement. The cable carrier is not part of the described device but is part of the described arrangement.

In particular at least a part of an upper run of the cable carrier can, as part of the cable carrier, lie on the rolling or glide surface, in particular via rollers. This refers to the configuration of the cable carrier with an upper run, a lower run, and a deflection region arranged therebetween. In this case, the support serves to hold the weight of the upper run at least partially. In particular, a side plate of the upper run can lie on the first rolling or glide surface.

In a preferred embodiment, the arrangement furthermore comprises a bracket with a guide surface. The support is held on the guide surface. The rolling or glide surface is oriented perpendicular to the guide surface. A part of the cable carrier is guided by the guide surface.

In particular in this configuration, the arrangement also comprises the abovedescribed device in addition to the cable carrier. The arrangement preferably comprises two of the devices which are arranged opposite each other.

In a further preferred embodiment of the arrangement, a tray surface which is oriented parallel to the rolling or glide surface of the support is formed at the bracket.

In particular at least a part of a lower run of the cable carrier can, as part of the cable carrier, lie on the tray surface. In particular, a side plate of the lower run can lie on the tray surface. In particular in the case of a U-shaped bracket, both side plates of the lower run can together lie on the tray surface. The tray surface can be formed in particular on an inner side of a base of the U-shaped bracket. If two devices arranged opposite each other are used together, a first one of the side plates preferably lies on the tray surface of a first one of the devices and a second one of the side plates preferably lies on the tray surface of a second one of the devices.

The tray surface can be formed on a part of the bracket. This part of the bracket can be formed integrally with the remainder of the bracket, in particular as a foot of the bracket, or be fastened to the bracket as a separate element. The separate element can be designed in the same way as the described support. The foot of the bracket is preferably formed from the same material as the remainder of the bracket. In contrast to the support which is preferably formed from a different material, when there are changes in temperature there are no stresses between the foot and the remainder of the bracket. The foot can therefore be designed so that it is continuous in the longitudinal direction with no expansion joint.

In a further preferred embodiment of the arrangement, the cable carrier has an upper run and a lower run. At least a part of the upper run lies on the rolling or glide surface. At least a part of the lower run lies on the tray surface.

In a preferred embodiment of the arrangement, the cable carrier has a plurality of rollers. A part of the cable carrier lies by means of the rollers on the rolling or glide surface formed by the support.

Figure 2:
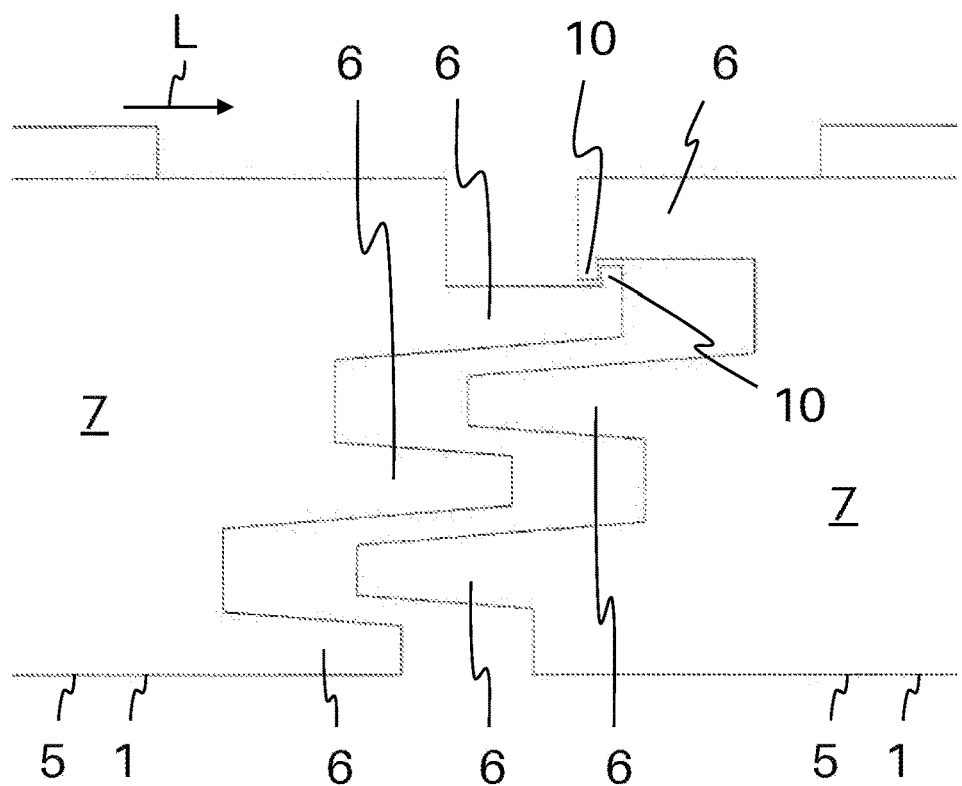
Figure 3A:
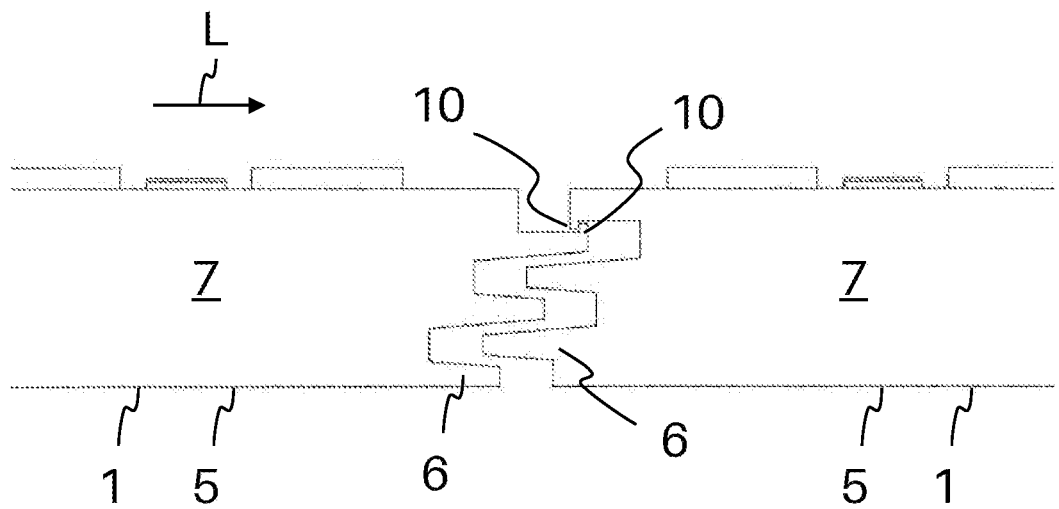
Figure 3B:
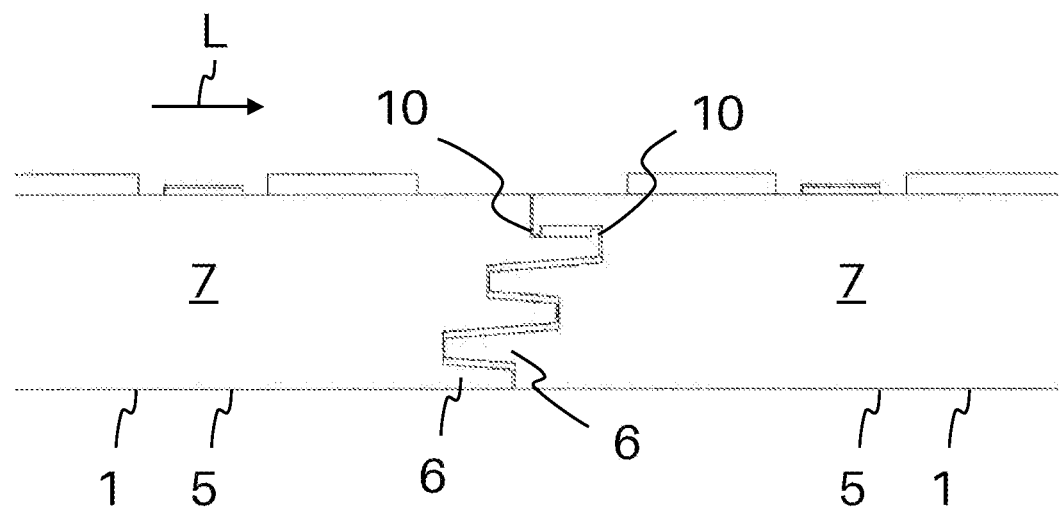
Figure 4:
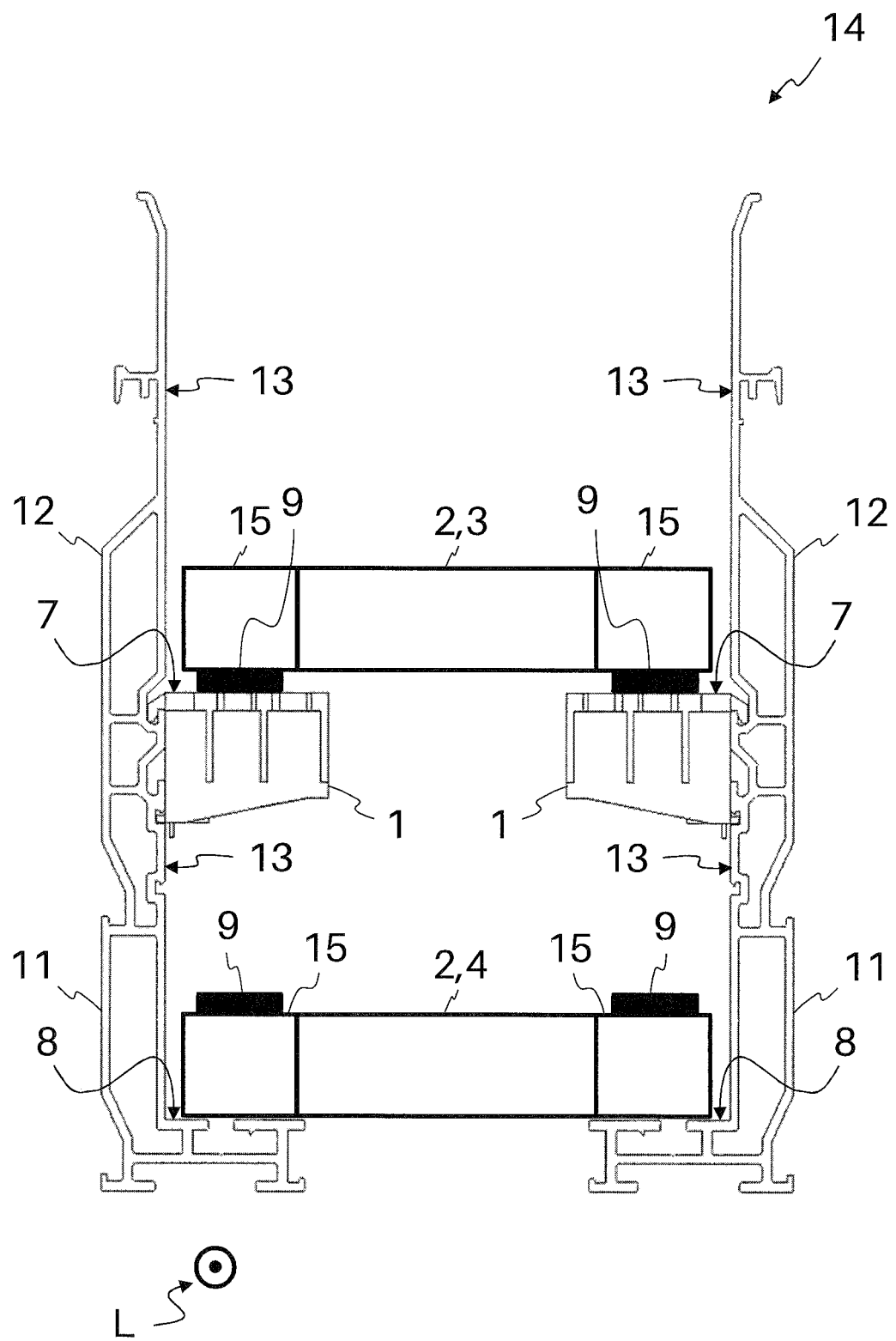
Figure 5:
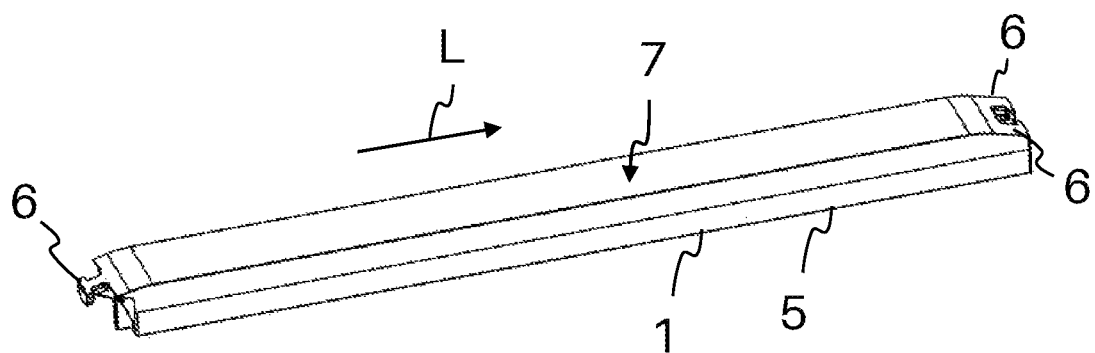
Figure 6:
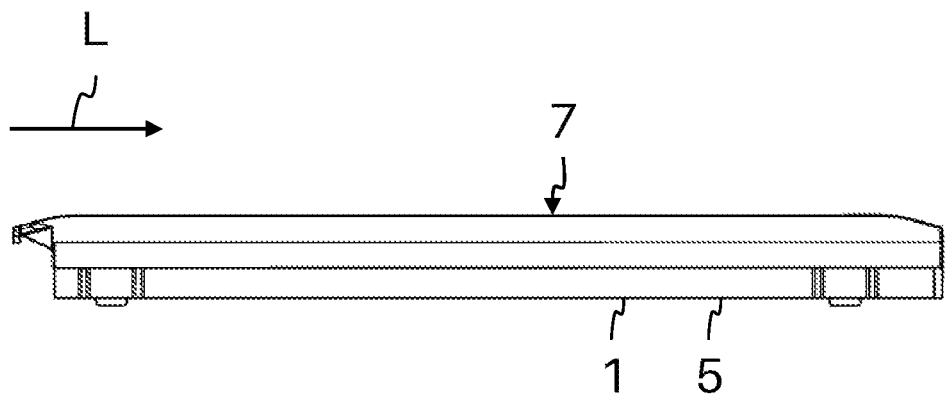
Figure 7:
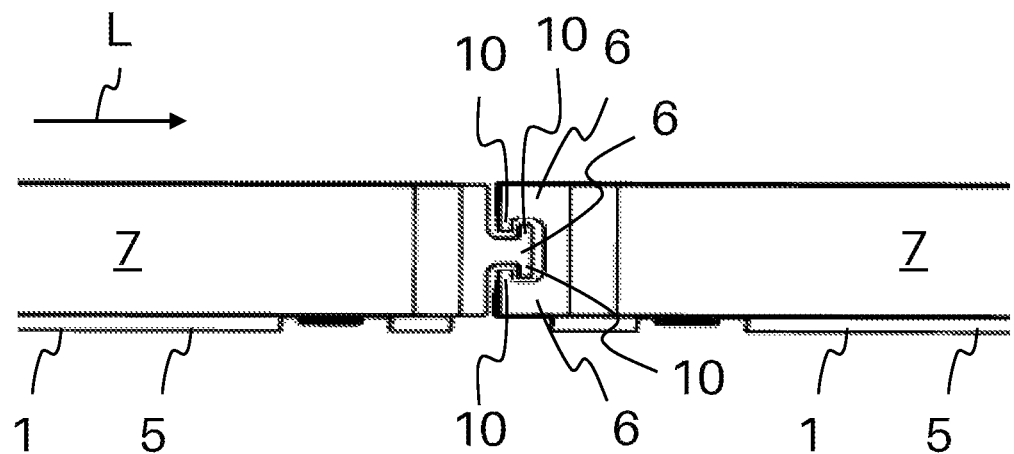

The invention is explained in detail below with the aid of the drawings. The drawings show a particularly preferred exemplary embodiment to which the invention is not, however, limited. The drawings and the proportions illustrated therein are only schematic. In the drawings:

FIG. 1: shows a device according to the invention for holding and guiding a cable carrier, FIG. 2: shows a plan view of a part of the support of the device from FIG. 1, FIGS. 3a and 3b: shows two further plan views of a part of the support of the device from FIG. 1, FIG. 4: shows an illustration in cross-section of an arrangement according to the invention comprising the device from FIG. 1, FIG. 5: shows a perspective illustration of a section of a support according to the invention, FIG. 6: shows a side view of the section from FIG. 5, FIG. 7: shows a plan view of the ends of two sections of a rolling support which is designed as shown in FIG. 5.

FIG. 1 shows a device 11 for holding and guiding a cable carrier 2 (shown in FIG. 4). The device 11 comprises a bracket 12 and a support 1 fastened thereto. The support 1 is divided into a plurality of sections 5 in a longitudinal direction L. The whole of a section 5 and part of a section 5 are shown in FIG. 1. The sections 5 have at their ends a respective plurality of teeth 6 by means of which the two sections 5 shown are interlocked with each other. It can be seen in FIG. 1 that the two sections 5 shown here engage into each other, where one of the teeth 6 is provided by way of example with a reference numeral.

The support 1 forms a rolling or glide surface 7 for the cable carrier 2. A part of the upper run 3 of the cable carrier 2 can lie on the rolling or glide surface 7. The rolling or glide surface 7 is partly formed by the teeth 6. The sections 5 together form the rolling or glide surface 7. The rolling or glide surface 7 is thus interrupted here, where the sections 5 adjoin one another and are interlocked with one another via the teeth 6. The support 1 is held on a guide surface 13 of the bracket 12. The rolling or glide surface 7 is oriented perpendicular to the guide surface 13. The cable carrier 2 can be guided by the guide surface 13.

A tray surface 8, which is oriented parallel to the rolling or glide surface 7, is furthermore formed on the bracket 12. A part of the lower run 4 of the cable carrier 2 can lie on the tray surface 8.

FIG. 2 shows a plan view of a part of the support 1 of the device 11 from FIG. 1. Shown here is the rolling or glide surface 7 at the transition between two adjacent sections 5 of the support 1. Both sections 5 have in each case three teeth 6 at their end shown. The teeth 6 of the two sections 5 engage in one another. The teeth 6 prevent a roller 9 (shown in FIG. 4) of the cable carrier 2 from dipping into an expansion joint between the sections 5 when it passes from one section 5 to the next. As a result, the roller 9 runs particularly quietly and smoothly. This is further reinforced by the teeth 6 being arranged offset relative to one another in the longitudinal direction L of the support 1. The passage of the roller 9 from one section 5 to the next thus takes place in a fashion that is distributed over time because the roller 9 meets the expansion joint between the teeth 6 at different times. Particularly quiet and smooth running of the cable carrier would also result in the case of a cable carrier without rollers.

It can furthermore be seen in FIG. 2 that the sections 5 have at their ends a respective stop element 10 by means of which the adjacent sections 5 can be moved apart from each other in the longitudinal direction L only to a limited extent. The situation in which the two sections 5 have been moved apart from each other to the maximum extent is shown in FIG. 2. In this situation, the stop elements 10 of the two sections 5 touch each other. The two sections 5 therefore cannot be pulled apart further in or counter to the longitudinal direction L. The support 1 is thus held together by the stop elements 10.

FIGS. 3a and 3b show two further plan views of a part of the support 1 of the device 11 from FIG. 1. The two sections 5 with the rolling or glide surface 7, the teeth 6, and the stop elements 10 are shown. FIG. 3a shows, as in FIG. 2, the situation in which the two sections 5 have been moved apart from each other to the maximum extent. FIG. 3b in contrast shows the situation in which the two sections 5 touch each other directly. FIGS. 3a and 3b thus show the two extreme situations between which the sections 5 can move.

FIG. 4 shows an illustration in cross-section of an arrangement 14 according to the invention comprising two of the devices 11 from FIG. 1 and a cable carrier 2. The two devices 11 are arranged opposite each other. The devices 11 are each formed by a bracket 12 and a support 1. It can be seen that side plates 15 of the upper run 3 of the cable carrier 2 lie with a respective roller 9 on the rolling or glide surfaces 7 of the devices 11, and that side plates 15 of the lower run 4 of the cable carrier 2 lie with a respective roller 9 on the tray surfaces 8 of the devices 11. Further rollers 9 outside the plane of the drawing can also lie on the rolling or glide surfaces 7. The cable carrier could also be designed without any rollers. It can furthermore be seen in FIG. 4 that the cable carrier 2 is guided by the guide surfaces 13 of the two devices 11. In the embodiment shown, this applies both for the upper run 4 and the lower run 4. The longitudinal direction L is perpendicular to the plane of the drawing in FIG. 4.

FIG. 5 shows a further embodiment of a section 5 of a rolling support 1 (not shown in more detail). It can be seen that the section 5 has a single tooth 6 at one of its ends and two teeth 6 at the other of its ends. The longitudinal direction L and the rolling and glide surface 7 are also indicated.

FIG. 6 shows a side view of the section 5 from FIG. 5. It can be seen that the rolling or glide surface 7 is flattened at both ends of the section 5 transversely to the longitudinal direction L.

FIG. 7 shows a part of a rolling support 1 with two sections 5 which are each designed as shown in FIGS. 5 and 6. It can be seen that the single tooth 6 of the section shown on the left has a T-shaped design and that the two teeth 6 of the other section 5 each have an L-shaped design. The two L-shaped teeth 6 are arranged such that a recess, in which the T-shaped tooth 6 can move only to a limited extent, is formed by them. In this respect, the teeth 6 as a whole form four stop elements 10.

LIST OF REFERENCE SYMBOLS 1 support
2 cable carrier 3 upper run
4 lower run
5 section
6 tooth
7 rolling or glide surface
8 tray surface
9 roller
10 stop element
11 device
12 bracket
13 guide surface
14 arrangement
15 side plate
L longitudinal direction

The invention claimed is:

1. A support for a cable carrier, wherein the support is divided in a longitudinal direction (L) into a plurality of sections, wherein the sections each have at least one tooth at their ends, wherein in each case two adjacent sections are interlocked with each other via the teeth, and wherein the sections have at their ends a respective stop element by means of which adjacent sections can be moved apart from each other in the longitudinal direction (L) of the support only to a limited extent.

2. The support as claimed in claim 1, wherein the support forms a rolling or glide surface for the cable carrier, and wherein the rolling or glide surface is formed partly by the teeth.

3. The support as claimed in claim 1, wherein at their ends the sections in each case have a plurality of teeth which are arranged offset relative to one another in the longitudinal direction (L) of the support.

4. The support as claimed in claim 1, wherein the sections each have between 1 and 10 teeth at their ends.

5. The support as claimed in claim 1, wherein the support forms a rolling or glide surface for the cable carrier, and wherein the rolling or glide surface is flattened transversely to the longitudinal direction (L) at at least one end of at least one of the sections.

6. A device for holding and guiding a cable carrier, comprising a bracket and a support fastened thereto, wherein the support is divided into a plurality of sections, wherein the sections each have at least one tooth at their ends, wherein in each case two adjacent sections are interlocked with each other via the teeth, wherein the bracket has a guide surface on which the support is held, and wherein a rolling or glide surface of the support is oriented perpendicular to the guide surface.

7. The device as claimed in claim 6, wherein the support is designed as a support for a cable carrier, and wherein the support is divided in a longitudinal direction (L) into the plurality of sections.

8. An arrangement comprising a cable carrier and a support, wherein the support is divided into a plurality of sections, wherein the sections each have at least one tooth at their ends, wherein in each case two adjacent sections are interlocked with each other via the teeth, and wherein a part of the cable carrier lies on a rolling or glide surface formed by the support, and furthermore comprising a bracket with a quide surface, wherein the support is held on the guide surface, wherein the rolling or glide surface is oriented perpendicular to the guide surface, and wherein a part of the cable carrier is guided by the guide surface.

9. The arrangement as claimed in claim 8, wherein the support is designed as a support for a cable carrier, and wherein the support is divided in a longitudinal direction (L) into the plurality of sections.

10. The arrangement as claimed in claim 8, wherein a tray surface which is oriented parallel to the rolling or glide surface of the support is formed at the bracket, and wherein a part of the cable carrier lies on the tray surface.

11. The arrangement as claimed in claim 10, wherein the cable carrier has an upper run and a lower run, wherein at least a part of the upper run lies on the rolling or glide surface, and wherein at least a part of the lower run lies on the tray surface.

12. The arrangement as claimed in claim 8, wherein the cable carrier has a plurality of rollers, and wherein a part of the cable carrier lies with the rollers on the rolling or glide surface formed by the support.

* * * * *